March 24, 1959     R. K-F SCAL     2,879,455

MINIATURE RADAR SUB-ASSEMBLY

Filed July 30, 1954

INVENTOR
ROBERT K-F SCAL

BY    *R. J. Tompkins*

ATTORNEY

United States Patent Office 2,879,455
Patented Mar. 24, 1959

2,879,455

MINIATURE RADAR SUB-ASSEMBLY

Robert K-F Scal, Englewood, N.J., assignor to the United States of America as represented by the Secretary of the Navy Application July 30, 1954, Serial No. 446,982

2 Claims. (Cl. 317—101)

(Granted under Title 35, U. S. Code (1952), sec. 266)

The invention described herein may be manufactured and used by or for the Government of the United States of America for governmental purposes without the payment of any royalties thereon or therefor.

The present invention relates to a miniature radar sub-assembly and more particularly to a miniature radar sub-assembly in which the various components are readily accessible and are interconnected by processed circuitry to facilitate rapid assembly and repair or replacement.

The use of standard sockets, plugs and soldered connections in radar sets has mitigated against the maximum utilization of space and has made the production, testing and repair of such sets both tedious and time consuming. Since the various components and their interconnecting leads have been positioned in close proximity within the smallest possible space, they have not been easily identifiable nor readily accessible. In addition, the interconnection of the numerous leads by soldering has been a painstaking process because of the limited space and difficulty of access. The disadvantages of prior known radar sets have been overcome in the present invention by separating the components into a number of groups, connecting the various components of each group into their proper circuits by processed circuitry, and then mounting each group of components on a separate chassis to form a number of individual sub-assemblies.

An object of the present invention is the provision of a miniature radar sub-assembly in which the various components are readily accessible for inspection, testing and repair.

Another object is to provide an electronic sub-assembly which is readily demountable.

A further object is the provision of a miniature radar sub-assembly in which the various components are interconnected by processed circuitry.

Other objects and many of the attendant advantages of this invention will be readily appreciated as the same becomes better understood by reference to the following detailed description when considered in connection with the accompanying drawings wherein.

Figure 1:
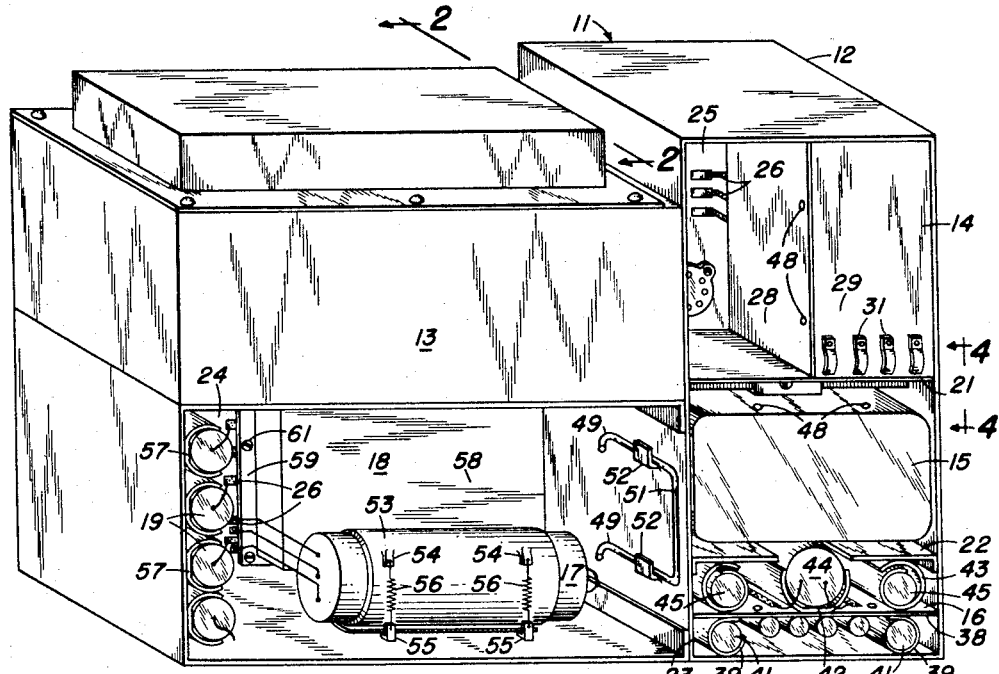
Fig. 1 is a perspective view of a miniature radar sub-assembly according to the present invention.

Referring more specifically to Fig. 1 of the drawing, a miniature radar sub-assembly 11 is shown having a supporting chassis 12 upon which are mounted a number of components, such as a power unit 13, a slideably removable shielded unit 14, a transformer 15, an oscillator unit 16, a socket-less tube 17, a shielding cover 18, and a plurality of capacitors or resistors 19. The supporting chassis 12 is made of light, strong material such as aluminum, magnesium, and etc., and is compartmentalized to receive the various components, as by partitions 21, 22 and 23. The front of the chassis is open to permit installation of and access to the various components and the rear of the chassis is covered by panels of insulation material 24 and 25 bearing processed circuitry as shown at 26. A number of circuits are processed on the panels 24 and 25 and the components are connected in the desired circuit by connection to the processed circuitry at the proper spot. The leads of the components may be soldered into eyelets set into the circuitry or they may be soldered directly to the circuitry as desired. The various circuits are connected to spring finger 27 (Fig. 2) which make sliding contact with contact strips (not shown) that are in turn connected to a source of power, as disclosed in my copending application Serial Number 426,947, filed April 30, 1954.

Figure 4:
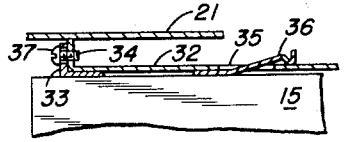
Fig. 4 is a sectional view along the line 4—4 of Fig. 1 showing the transformer mounting.

The shielded unit 14 consists of a number of interconnected electrical components which are shielded by the plate 28 and the partition 21 to prevent R.-F. leakage to adjacent components. The components in unit 14 are connected to and energized through the fingers 31 on insulated panel 29, thus doing away with the necessity of connecting the components to the panel 25 and permitting the unit 14 to be slid out of the chassis and replaced by a similar unit when repairs are necessary. The transformer 15 is mounted on partition 21 by a bracket and a clip with one readily accessible screw. As shown in Fig. 4, an angular bracket 32 attached to partition 21 is provided with a threaded hole 34 in its forward face and an opening 35 near its opposite extremity. Secured to the upper surface of transformer 15 is an angular clip 33 having a resilient end portion 36 free to move vertically. To assemble the transformer on the chassis, the transformer leads (not shown) are connected to the circuitry on panel 25, the resilient end 36 of clip 33 is pushed through the opening 35 until it bears against the upper surface of the bracket, and a screw 37 is passed through the front face of the clip and threaded into the hole 34 to hold the clip and the bracket together. The transformer can be readily removed by reversing the above procedure. Depending upon what type of component is mounted above the transformer, the flat partition 21 may be omitted and the bracket 32 secured to the chassis to serve as a partition.

Figure 5:
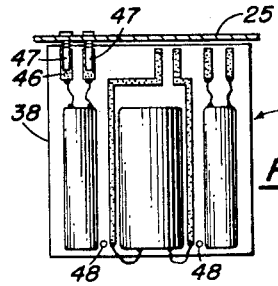
Fig. 5 is a plan view of the oscillator unit of Fig. 1.

The oscillator unit 16, shown in Figs. 1 and 5, is slideably positioned in the chassis below partition 22 and consists of a number of components carried by a panel 38 of insulating material having processed circuitry on its upper and lower surfaces. The various components of the oscillator unit, such as tubes, capacitors, resistors and a post transformer are mounted horizontally on both surfaces of the panel 38 by a series of resilient clips. The clips 39 suspend the capacitors 41 beneath the panel 38 while the clips 42 and 43 position the post transformer 44 and tubes 45 respectively on the upper surface of the panel. The light metal clips 43, 43 cover the lateral surfaces of the tubes 45, 45 to perform the secondary functions of shielding against R.-F. leakage and of transfer of heat from the tubes to the surrounding air. The components are connected, by leads and by the processed circuitry, to processed contact strips 46 along the rear edge of the panel 38. As shown in Fig. 5, a number of spring fingers 47 project from the rear panel 25 and are connected to the circuitry thereon. When the oscillator unit 16 is positioned in the chassis, the fingers 47 slide along the contacts 46 energizing the oscillator unit and helping to retain the unit in the chassis.

The units 14, 15 and 16 are each fitted snugly into the chassis in the smallest possible space with no projecting parts and are consequently difficult to grasp for removal. To facilitate easy removal for inspection or repair, each of the units 14, 15 and 16 is provided with a pair of spaced openings 48 into which the ends 49, 49 of handle 51 are adapted to be inserted, thus providing a means for readily withdrawing the unit from the chassis. For convenience, the handle 51 is clipped to the chassis, as by ears 52, 52.

Figure 2:
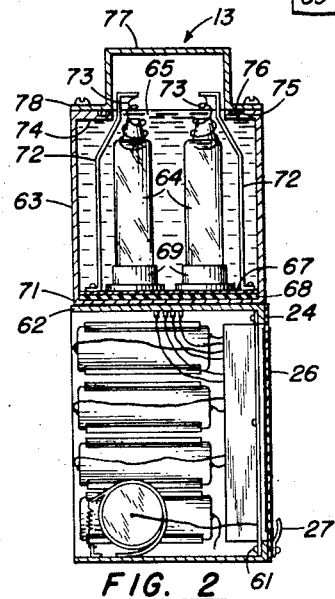
Fig. 2 is a sectional view along the line 2—2 of Fig. 1 showing the interior of the power unit.

The socket-less tube 17 is mounted horizontally on the chassis by means of a thin, flexible, metallic strap 53. Since no socket is required for this type tube, the leads are wired directly to the processed circuitry on panel 24. As shown in Figs. 1 and 2, one end of strap 53 is secured to the chassis while the other end is free. Ears 54, 54 are provided on the outer surface of the strap approximately equidistant from the ends, and lugs 55, 55 are affixed to the chassis near the fixed end of the strap in line with the ears 54, 54. In mounting the tube 17, it is placed on the fixed end of the strap and the free end thereof wrapped around it. The ears and lugs are then connected by a pair of tension springs 56, 56 which hold the strap snugly against the tube. The strap, extending completely around the tube and shielding it against R.-F. leakage, is formed of light metal (such as beryllium copper) having a high degree of conductivity for the rapid transfer of heat from the tube to the atmosphere.

The capacitors 19 are mounted in a vertical row on one of the sides of the chassis or upon a partition therein by means of resilient clips 57 similar to the clips 42 of the oscillator unit. The capacitor leads may be connected to either the circuitry on panel 24, as shown, or one of the adjacent components, such as the tube 17 or the power unit 13, whichever is desired. The shielding cover 18, having a raised body portion 58 surrounded by a mounting flange 59, is adapted to be attached to the panel 24 to shield various components mounted directly on panel 24 against R.-F. leakage. The shielding cover is attached by means of screws 61 for easy removal for access to the components on panel 24.

Figure 6:
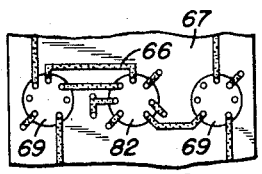
Fig. 6 is a sectional view along the line 6—6 of Fig. 3.
Figure 3:
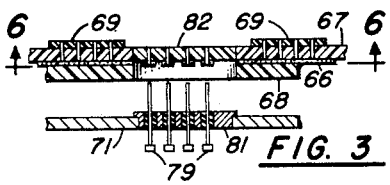
Fig. 3 is an enlarged view in section of the plug and receptacle of the power unit of Fig. 2.

The power unit 13 affixed to the top portion 62 of the chassis consists of a number of miniature tubes 64 positioned in a rectangular metallic container 63 filled with heat transfer fluid 65. As shown in Figs. 2 and 3, a base panel 67 bearing processed circuitry 66 on its lower surface is positioned in the container 63 and is separated from the bottom 71 of the container by a plate of insulating material 68. A number of miniature tube sockets 69 are mounted on the upper surface of base panel 67 along with an equal number of tube retainers 72 positioned adjacent thereto. The upper end of each retainer 72 overlies its adjacent tube socket and supports a spiral compression spring 73 thereabove. The container 63 is provided with an inturned lip 74 at its upper edge which is grooved, as at 75, to receive an O-ring 76. A cover consisting of a rectangular raised body portion 77 and a peripheral mounting flange 78 is adapted to be secured to the lip 74, compressing the O-ring 76 and sealing the fluid 65 within the container. Referring to Fig. 2, the power unit is assembled by placing the tubes 64 in their respective sockets 69, then compressing the springs 73 over the upper ends of the tubes to retain them in the sockets, filling the container with heat transfer fluid (such as silicones liquid) and securing the cover in place. The heat transfer fluid conducts the heat generated by the tubes to the sides and ends of the container where it is dissipated to the atmosphere. The air space under the raised portion of the cover does away with the need of a vent and allows the container to be completely sealed and made air-tight since any expansion of the fluid under heat merely compresses the air in the cover. In addition, the container and cover are so dimensioned and the tubes so positioned within the container that they are constantly submerged in the heat transfer fluid regardless of the position of the power unit. Similarly to the other components mounted on the chassis, the power unit is energized from panel 24. A plug 81 having a plurality of pins 79 is hermetically sealed in the bottom 71 of the container. The lower ends of pins 79 extend through an opening in chassis portion 62 and are connected to panel 24 by leads as shown in Fig. 2. The upper ends of the pins pass through an opening in plate 68 and are received in a receptacle or socket 82 in base panel 67, see Fig. 3. The receptacle 82 is electrically connected to the various tube sockets 69 by the processed circuitry 66 as shown in Fig. 6. The base panel 67 and insulating plate 68 can each be made in two interfitting parts to facilitate introducing them into the container. The tube sockets 69 are standard miniature seven or nine hole sockets and the receptacle 82 and plug 81 can likewise be formed with seven or nine holes and pins as desired.

The various processed circuits on the panels 24, 25, 38 and 67 are what is commonly called printed circuitry, however such circuitry can be formed by a number of processes including printing by silk screen or other methods, stamping of metallic powder and plating and etching. The circuitry itself can be formed of silver plated copper, silver, or aluminum. Silver or silver plated copper is more suitable for the present use than copper alone since silver provides better conductivity and greater resistance to corrosion and also, silver oxide is a conductor while copper oxide is a resistor.

The panels 24 and 25 are individually attached to the chassis so that each can be removed or replaced without disturbing the other, however, in certain instances where all the components on the chassis are interconnected in the same circuit it may be desirable to provide a single panel instead of the two illustrated. If desired, various components or elements can be mounted directly on the panels, such as the tube socket on panel 25. In addition, further shielding of the components in unit 14 and those under cover 18 may be provided by plating the unused portions of the rear surfaces of panels 29 and 24 respectively.

The panels themselves are formed of a light strong insulating material such as glass fabric or fiber glass bonded with silicone resin, phenolic resin or Teflon, or similar materials.

Obviously many modifications and variations of the present invention are possible in the light of the above teachings. It is therefore to be understood, that within the scope of the appended claims, the invention may be practiced otherwise than as specifically described.

What is claimed is:

1. A miniature radar sub-assembly including a hollow chassis subdivided into compartments; an insulated panel bearing printed circuitry attached to the rear surface of the chassis; a plurality of spring fingers mounted on the inner surface of said panel and connected to the circuitry, said fingers projecting into one of said compartments; and an electronic unit having a plurality of contacts thereon, said unit being slidably received in said compartment with the contacts bearing against said fingers, a power unit mounted on said chassis comprising a rectangular air-tight container filled with heat transfer liquid; a cover having an air space therein sealed to the top of the container; an insulated base panel having a plurality of tube sockets on its upper surface, said panel being positioned in the bottom of said container; and a plurality of tubes mounted in the sockets and so positioned as to be constantly submerged in the liquid in any position of the container.

2. A miniature radar sub-assembly including a hollow chassis subdivided into compartments; an insulated panel attached to the rear surface of the chassis, said panel having printed circuitry on its inner surface; and a plurality of tubes mounted in said compartments and connected to said circuitry, said tubes being retained in the compartments by metallic strips surrounding the side surfaces thereof, said strips serving to shield the tubes from R.-F. leakage and to conduct heat therefrom, a power unit mounted on said chassis comprising a rectangular air-tight container filled with heat transfer liquid; a cover having an air space therein sealed to the top of the container; an insulated base panel having a plurality of tube sockets on its upper surface, said panel being positioned in the bottom of said container; and a plurality of tubes mounted in the sockets and so positioned as to be constantly submerged in the liquid in any position of the container.

References Cited in the file of this patent

UNITED STATES PATENTS

| | | |
|---|---|---|
| 1,661,535 | Haddock | Mar. 6, 1928 |
| 1,950,653 | Best | Mar. 13, 1934 |
| 2,041,112 | Bucher | May 19, 1936 |
| 2,268,619 | Reid | Jan. 6, 1942 |
| 2,344,441 | Lorenz | Mar. 14, 1944 |
| 2,394,060 | Holmes | Feb. 5, 1946 |
| 2,439,326 | Wilson | Apr. 6, 1948 |
| 2,462,491 | Hallett | Feb. 22, 1949 |
| 2,474,988 | Sargrove | July 5, 1949 |
| 2,488,372 | Breisch | Nov. 15, 1949 |
| 2,508,030 | Karns | May 16, 1950 |
| 2,560,320 | Winkler | July 10, 1951 |
| 2,602,842 | Morris | July 8, 1952 |
| 2,668,933 | Shapiro | Feb. 9, 1954 |
| 2,696,595 | Coster | Dec. 7, 1954 |